(12) United States Patent
Maloney et al.

(10) Patent No.: US 7,569,768 B2
(45) Date of Patent: Aug. 4, 2009

(54) HARDWARE FREE DATA DISTRIBUTION TERMINAL PEDESTAL

(75) Inventors: Jerome A Maloney, Sugar Grove, IL (US); George I Wakileh, Batavia, IL (US); Simon Shen-Meng Chen, Palatine, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 0 days.

(21) Appl. No.: 11/733,895

(22) Filed: Apr. 11, 2007

(65) Prior Publication Data

US 2008/0253105 A1  Oct. 16, 2008

(51) Int. Cl.
*H02G 9/00* (2006.01)
(52) U.S. Cl. ............... 174/38; 174/39; 52/3; 220/4.26; 631/664

(58) Field of Classification Search ............ 174/37, 174/38, 39, 17 R, 17 CT, 58, 59, 60; 138/11, 138/112, 115; 312/263, 223.6, 265.5; 220/3.3, 220/3.8, 4.02, 4.26, 475, 4.21; 631/664; 52/3

See application file for complete search history.

(56) References Cited

U.S. PATENT DOCUMENTS

| 3,868,474 | A | * | 2/1975 | Bunten | 174/38 |
| 4,058,670 | A | * | 11/1977 | Leschinger | 174/38 |
| 5,384,427 | A | * | 1/1995 | Volk et al. | 174/38 |
| 6,598,949 | B2 | * | 7/2003 | Frazier et al. | 312/263 |

\* cited by examiner

*Primary Examiner*—Dhiru R Patel
(74) *Attorney, Agent, or Firm*—Harness, Dickey & Pierce, P.L.C.

(57) ABSTRACT

In various embodiments, the present disclosure provides a base for a data distribution terminal pedestal that includes a first wall structure interlockingly connectable with a second wall structure such that the base can be assembled absent assembly hardware.

23 Claims, 4 Drawing Sheets

HARDWARE FREE DATA DISTRIBUTION TERMINAL PEDESTAL

FIELD

The present teachings relate to outdoor data distribution terminal pedestals.

BACKGROUND

The statements in this section merely provide background information related to the present disclosure and may not constitute prior art.

A primary concern among data communication service providers today is the amount of time and resources required to install and use outside plant data communication equipment such as distribution terminal pedestals. Distribution terminal pedestals are utilized to provide a housed connection point for passive, i.e., non-powered, type connections. For example, distribution terminal pedestals can be utilized to house the connection points of one or more telecommunication central transmission lines to one or more customer service transmission lines. The pedestals generally protect the connection points from various environmental factors, tampering, etc., but can also be opened to allow access by a service person.

At least some known distribution terminal pedestals include a one-piece dome attached to a two-piece base, in which various passive connections can be made. The two-piece base is typically coupled together using hardware, such as nuts and bolts, retaining clips and screws, etc. Additionally, often a spade or stake can be attached to the base to add additional stability to pedestal when placed in the ground. In such cases, the spade or stake is either integrally formed with one-half of the base or attached to the base using hardware.

Furthermore, initial installation of such pedestals, and subsequent access to the passive connections housed within, typically require the use of tools to fasten and unfasten the hardware coupling the components together. Thus, the requirement of hardware to couple the components together adds considerable parts and labor costs to the installation and servicing of such known pedestals.

SUMMARY

At least in part, the present disclosure provides a base for a data distribution terminal pedestal. In accordance with various embodiments, the base includes a first wall structure interlockingly connectable with a second wall structure to thereby form the base. Thus, the base can be assembled absent assembly hardware.

Additionally, at least in part, the present disclosure provides a data distribution terminal pedestal. In accordance with various embodiments, the data distribution terminal includes a two-piece, assembly hardware free base. The base includes a first wall structure interlockingly connectable to a second wall structure to thereby form the base absent assembly hardware. The pedestal additionally includes a top cover that is removably mountable to a top portion of the base.

In accordance with other embodiments, the data distribution terminal pedestal includes a pedestal base first wall structure including a first longitudinal tongue extending along a first longitudinal edge portion. The base first wall structure additionally includes a second longitudinal tongue extending along a second longitudinal edge portion. Each of the first and second tongues include a plurality of latching buttons having stems integrally formed with and extending substantially orthogonally from the respective tongue. Each latching button additionally includes a cap integrally formed at a distal end of each stem.

The pedestal base second wall structure including a plurality of interlocking slots formed within each of a first longitudinal edge portion and a second longitudinal edge portion. The slots are sized to receive a corresponding latching button stem such that the base first and second wall structures can be coupled together to form the base, absent assembly hardware, by interlocking each stem within a corresponding interlocking slot.

The data distribution terminal pedestal further includes a top cover that is removably mountable to a top portion of the interlocked base first and second wall sections.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
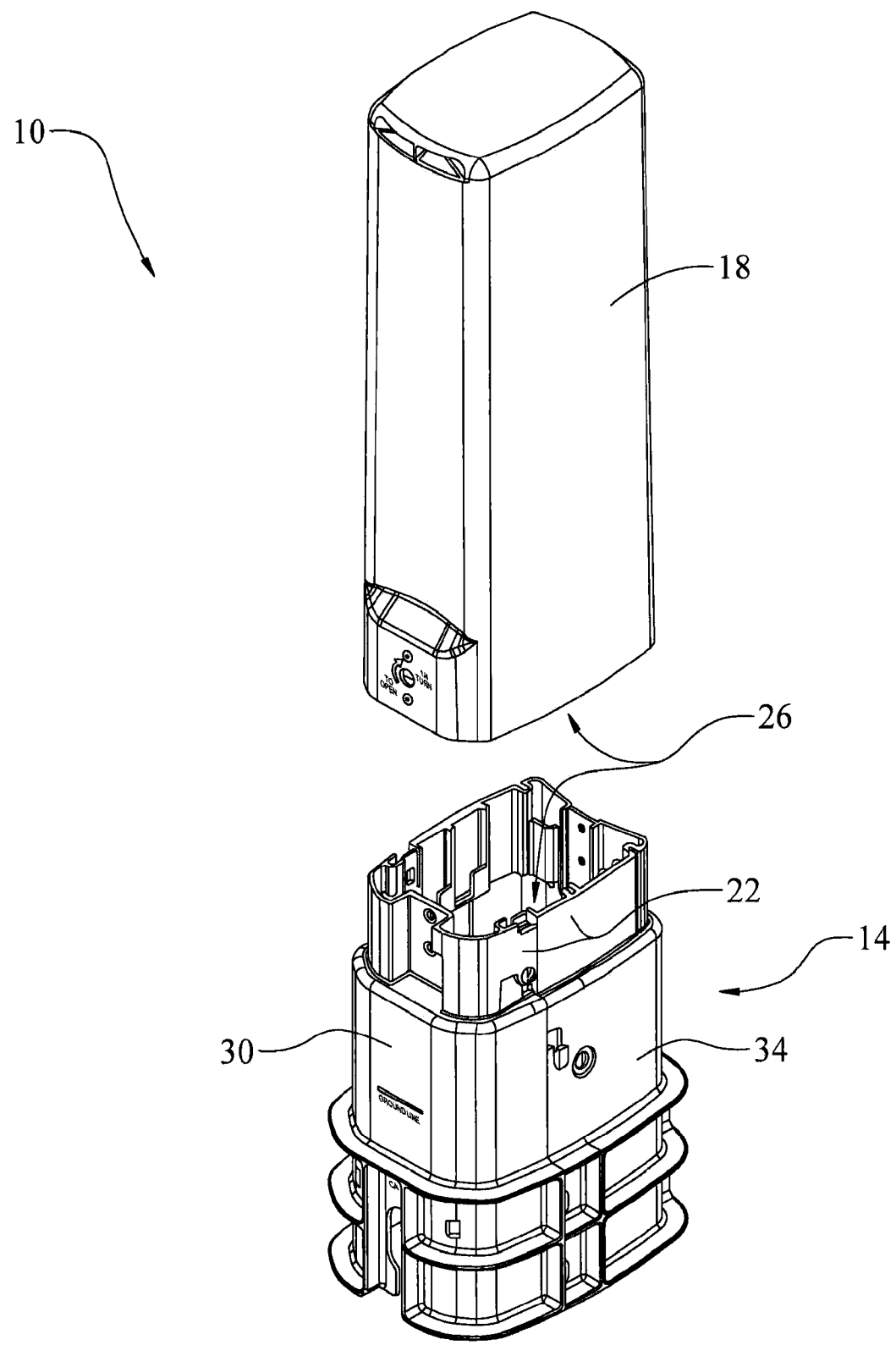
FIG. 1 is an exploded isometric view of a data distribution terminal pedestal, in accordance with various embodiments of the present invention.

The following description is merely exemplary in nature and is in no way intended to limit the present teachings, application, or uses. Throughout this specification, like reference numerals will be used to refer to like elements.

Referring to FIG. 1, a data distribution terminal pedestal 10 is provided, in accordance with various embodiments of the present disclosure. For simplicity and clarity the data distribution terminal pedestal 10, will be referred to herein simply as the pedestal 10. The pedestal 10 generally includes a two-piece, assembly hardware free base 14 and a top cover 18 that fits over a reduced dimensioned top portion 22 of the base 14 to form an enclosed interior chamber 26. The two-piece, assembly hardware free base 14 includes a first wall structure 30 and a second wall structure 34 that are interlockingly connectable to form the base 14. Specifically, the first and second wall structures 30 and 34 are structured, or formed, to couple together such that the base 14 can be assembled and form the interior chamber 26 without the use of assembly hardware. More specifically, as described further below, the base 14 can be assembled on-site by coupling together the first and second wall structures 30 and 34 without the use of assembly hardware or related tools.

As used herein, assembly hardware includes any separate, independent, stand-alone fastening device or mechanism used to couple together two or more components, parts or structures, e.g., components of known data distribution terminal pedestals. Also, as used herein, tools include any handheld tool used to install such assembly hardware. For example, assembly hardware can include screws, nuts and bolts, rivets, push-in plugs or pins, etc., and the associated tools can include screw drivers, drills, screw guns, rivet guns, wrenches, nut drivers, etc.

In various implementations, the pedestal 10 can be utilized to protect connection points of one or more main, or central, data distribution cables with one or more service lines to customer locations. Typically, such main distribution cables and service lines are run underground to a desired location where they are brought above ground and terminated. The base 14 can be quickly and easily assembled on-site, absent assembly hardware, and partially buried in the ground around the terminal ends of the main cables and service lines. Thus, the terminal ends of the main cables and service lines are enclosed within the interior chamber 26, which can include any interior area of the top cover 18 that may exist above the base 14 when the top cover 18 is coupled to the base 14. Any and all desired connections between the terminal ends of the main cables and service lines can then be made and the top cover 18 installed to enclose the connections. Thus, the connections are disposed within the interior chamber 26 and protected from weather, contaminates, tampering, vandalism, etc.

Figure 2:
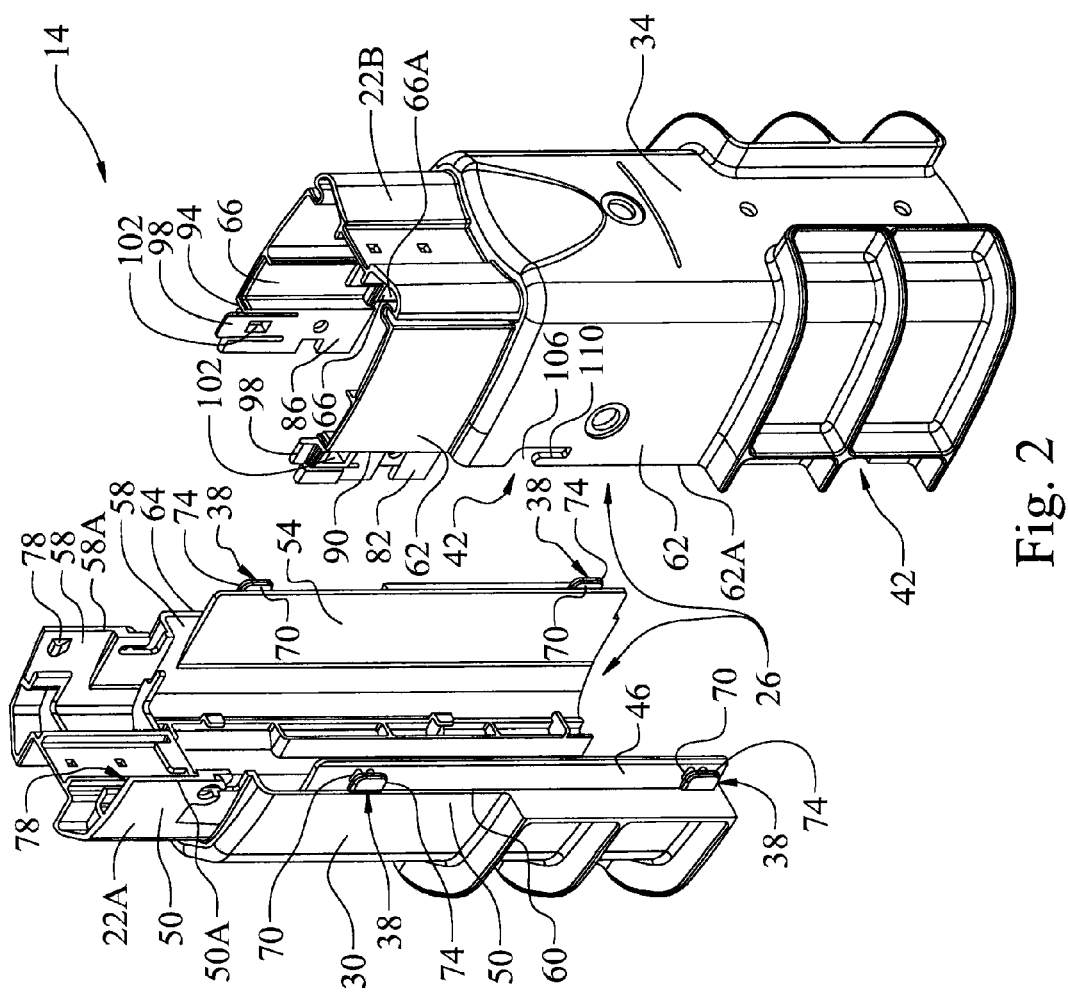
FIG. 2 is an exploded isometric view of a data distribution terminal pedestal base, in accordance with various embodiments of the present disclosure.

FIG. 2 is an exemplary illustration of the base 14, in accordance with various embodiments. As described above, the base 14 includes the first and second wall structures 30 and 34 that can be coupled together, absent assembly hardware, to form the base 14. More particularly, the first and second wall structures 30 and 34 are interlockingly connectable via integrally formed latching buttons 38 that interlockingly mate with corresponding integrally formed interlocking slots 42.

As illustrated, the first wall structure 30 includes a first longitudinal tongue 46 extending along a first longitudinal edge portion 50 of the base first wall structure 30. The first wall structure 30 additionally includes an opposing second longitudinal tongue 54 extending along an opposing second longitudinal edge portion 58 of the base first wall structure 30. More specifically, the first and second longitudinal tongues 46 and 54 extend from and are coplanar with an interior side of the respective first and second longitudinal edge portions 50 and 58. Accordingly, the first longitudinal tongue 46 forms a first lip 60 with the first longitudinal edge portion 50, and the second longitudinal tongue 54 forms a second lip 64 with the second longitudinal edge portion 58.

Integrally formed with and extending substantially orthogonally from each of the first and second longitudinal tongues 46 and 54 are one or more latching buttons 38. Correspondingly, the second wall structure 34 includes at least one interlocking slot 42 integrally formed within a first longitudinal edge portion 62 and at least one interlocking slot 42 integrally formed within a second longitudinal edge portion 66. The number and location of the interlocking slots 42 are such that for each latching button 38 there is a corresponding interlocking slot 42 within the respective first and second edge portions 62 and 66 of the second wall structure 34. Additionally, although the one or more interlocking slots 42 integrally formed within the second longitudinal edge portion 66 are obscured from view in FIG. 2, one skilled in the art would easily and readily understand that the second longitudinal edge portion 66 and one or more integrally formed interlocking slots 42 are substantially a mirror image of the first longitudinal edge portion 62 and integrally formed interlocking slots 42, clearly illustrated in FIG. 2.

Figure 3:
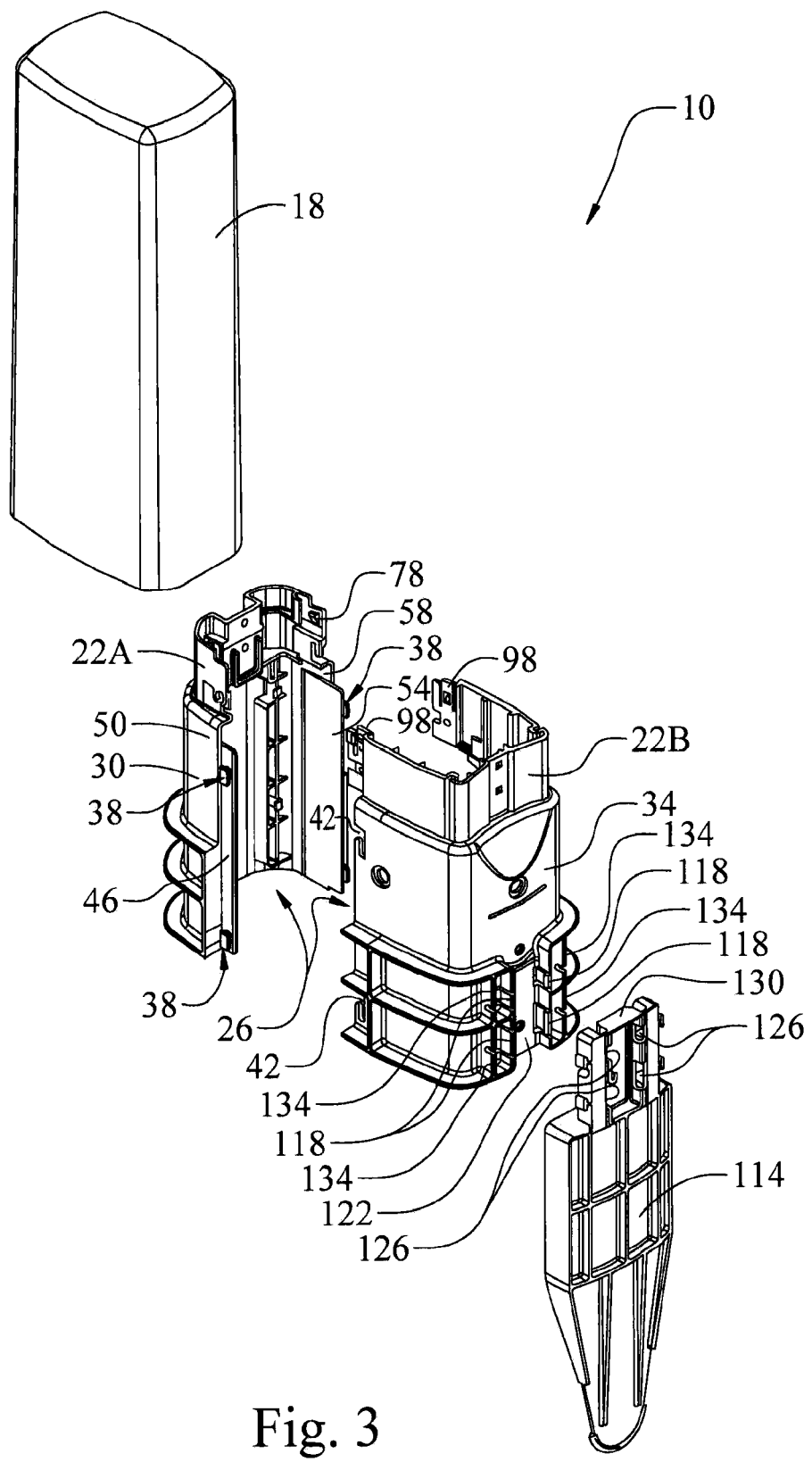
FIG. 3 is an exploded isometric view of a data distribution terminal pedestal including a base and an auxiliary stability spade, in accordance with various embodiments of the present disclosure.

Although, as described above, the base first and second wall structures 30 and 34 can respectively include one or more of the latching buttons 38 and corresponding interlocking slots 42, FIGS. 2 and 3 exemplarily illustrate a plurality of each of the latching buttons 38 and corresponding interlocking slots 42. Accordingly, for simplicity and clarity the one or more latching buttons 38 and the one or more interlocking slots 42 will be referred to hereafter in the plurality.

Each latching button 38 includes a stem 70 integrally formed with and extending substantially orthogonally from the respective longitudinal tongue 46 and 54. Each latching button 38 additionally includes a cap 74 integrally formed at a distal end of the stem 70. The caps 74 are generally flat and extend substantially orthogonally from a longitudinal axis of the stems 70 such that a profile of the latching buttons 38 has substantially a 'T' shape. The stem 70 of each latching button 38 is sized to fit within the corresponding interlocking slot 42. Additionally, each latching button 38 is formed such that a longitudinal length of each stem 70 is substantially equal to, or slightly greater than, a thickness of respective first and second edge portions 62 and 66 of the second wall structure 34.

With further reference to FIG. 2, as described above, the two-piece, assembly hardware free base 14 includes a reduced dimensioned top portion 22. More specifically, the first wall structure 30 includes a reduced dimensioned top portion 22A and the second wall structure 34 includes a reduced dimensioned top portion 22B. As readily understood by one skilled in the art, when the first and second wall structures 30 and 34 are coupled together, as described below, reduced dimensioned top portions 22A and 22B combine to form the reduced top portion 22.

In accordance with various embodiments, the first wall structure 30 includes a pair of latching bosses 78 integrally formed with an interior surface of the first wall structure top portion 22A. Specifically, one latching boss 78 is formed with the top portion 22A interior surface along the first longitudinal edge portion 50, and the second latching boss 78 is formed with the top portion 22A interior surface along the second longitudinal edge portion 58. Although the latching boss 78 integrally formed with the interior surface of the first longitudinal edge portion 50 is obscured from view in FIG. 2, one skilled in the art would easily and readily understand that particular latching boss 78 is substantially a mirror image of the latching boss 78 integrally formed with the interior surface of the second longitudinal edge portion 58, clearly illustrated in FIG. 2.

The second wall structure 34 additionally includes a first longitudinal shoulder 82 extending from the top portion 22B along the first longitudinal edge portion 62, and a second longitudinal shoulder 86 extending from the top portion 22B along the second longitudinal edge portion 66. More specifically, the first and second longitudinal shoulders 82 and 86 extend from and are coplanar with an interior side of the top portion 22B. Accordingly, the first longitudinal shoulder 82 forms a first offset 90 with the first longitudinal edge portion 50, and the second longitudinal shoulder 86 forms a second offset 94 with the second longitudinal edge portion 58.

The first and second longitudinal shoulders 78 and 82 each have integrally formed therein a biased latching tab 98. Each latching tab 98 includes a retention aperture 102 and corresponds to a respective one of the latching bosses 78 of first wall structure 30. The retention apertures 102 are sized to receive and engage the respective corresponding latching boss 78 when the first and second wall structures 30 and 34 are coupled together, as described below. As illustrated in FIG. 2, in various embodiments, the biased latching tabs 98 are integrally formed, e.g., molded, within the top portion 22B of the second wall structure 34. Accordingly, the biased latching tabs 98 are biased to an upright position, as illustrated, or slightly inward toward the interior chamber 26, by their integral formation with the top portion 22B. However, in other various embodiments, the biased latching tabs 98 can be biased to the upright, or slightly inward, position, using any suitable biasing devices, such as a coil or leaf spring. In such embodiments, the biasing devices can be utilized to supplement the biasing force provided by integrally forming the latching tabs 98 with the top portion 22B. Or, the biasing devices can be further used to connect the latching tabs 98 to the top portion 22B.

To assemble the base 14, i.e., interlockingly couple the first and second wall structures 30 and 34 together absent assembly hardware, the latching buttons 38 are interlockingly mated with the corresponding interlocking slots 42. More particularly, in various embodiments, the interlocking slots 42 generally have an 'L' shape and include a mouth 106 and a locking leg 110. Therefore, the stems 70 of each latching button 38 can be inserted into the mouth 106 of the corresponding 'L' shaped interlocking slot 42. The first and second wall structures 30 and 34 can then be moved longitudinally with respect to each other such that the stems 70 are moved into interlocking slot legs 110. Thus, the latching buttons 38 are interlockingly mated with the interlocking slots 42 to interlockingly couple the first and second wall structures 30 and 34 together, forming the base 14 absent assembly hardware.

Additionally, when the latching button stems 70 are fully inserted into interlocking slot mouths 106, leading edges 62A and 66A of the respective second wall structure first and second edge portions 62 and 66 substantially abut the first and second lips 60 and 64 of the first wall structure 30. Similarly, leading edges 50A and 58A of the respective first and second edge portions 50 and 58, at first wall structure top portion 22A, substantially abut the first and second offsets 90 and 94 of the second wall structure top portion 22B. In this position, prior to interlocking the stems 70 within the interlocking slot legs 110, the latching bosses 78 are located below, and aligned with, the biased latching tab apertures 98. Therefore, when one or both of the first and second wall structures 30 and 34 are longitudinally moved with respect to each other to interlocking mate the latching buttons 38 with the interlocking slots 42, the latching bosses are engaged within the respective latching tab apertures 102. Particularly, as the first and second wall structures 30 and 34 are longitudinally moved with respect to each other, the latching tabs 98 are cammed over the latching bosses 78. When the latching button stems 70 approach, or hit, the bottom of the respective interlocking slot legs 110, the latching bosses 78 are generally centered with respective latching tab apertures 110. The biased nature of the latching tabs 98 then forces the latching tabs 98 inward, toward the interior chamber 26, to thereby engage the latching bosses 78 within the respective latching tab apertures 98. Engaging the latching bosses 78 within the respective latching tab apertures 98 substantially retains the interlocked engagement of latching buttons 38 within the latching slot 42.

Furthermore, as the first and second wall structures 30 and 34 are moved together to insert latching button stems 70 into the interlocking slots 42, the first and second longitudinal tongues 46 and 54 slide along the interior surfaces of the second wall structure first and second longitudinal edge portions 62 and 66. Similarly, as the first and second wall structures 30 and 34 are moved together, the first and second longitudinal shoulders 82 and 86 slide along the interior surfaces of the first wall structure first and second longitudinal edge portions 50 and 58, at the top portion 22A. This interlocking alignment of the first and second longitudinal tongue portions and shoulders 46, 54, 82 and 86 with the respective edge portions 62, 66, 50 and 58, aids in aligning the first and second wall structures 30 and 34 during assembly and provides structural stability of the assembled base 14.

In various embodiments, the interlocking slot legs 110 can be formed such that each leg is slightly canted away from the respective leading edges 62A and 66A. Accordingly, as the first and second wall structures 30 and 34 are moved longitudinally with respect to each other and the stems 70 are moved into interlocking slot legs 110, the canting of the legs 110 cause the wall structures 30 and 34 to be pulled toward each other. Therefore, the leading edges 50A, 58A, 62A and 66A, of the respective first and second wall structures 30 and 34, will be pulled into firm abutment with the respective lips 60 and 64 and offsets 90 and 94 of the respective opposing first and second wall structures 30 and 34.

To access the lower portion of interior chamber 26 after the base 14 has been assembled, as described above, the first and second wall structures 30 and 34 can be easily separated by disengaging the latching tabs 98 and lifting up on the first wall structure 30. More specifically, to separate the first and second wall structures 30 and 34, the latching tabs 98 can be pushed outwardly, away from the interior chamber 26 to disengage the latching bosses 78. With the latching tabs 98 disengaged, one or both of the first and second wall structures 30 and 34 can be longitudinally moved with respect to each other such that the latching buttons 38 are moved toward the latching slot mouths 106. The first and second wall structures 30 and 34 can then be separated to provide access to the lower portion of the interior chamber 26.

Figure 4:
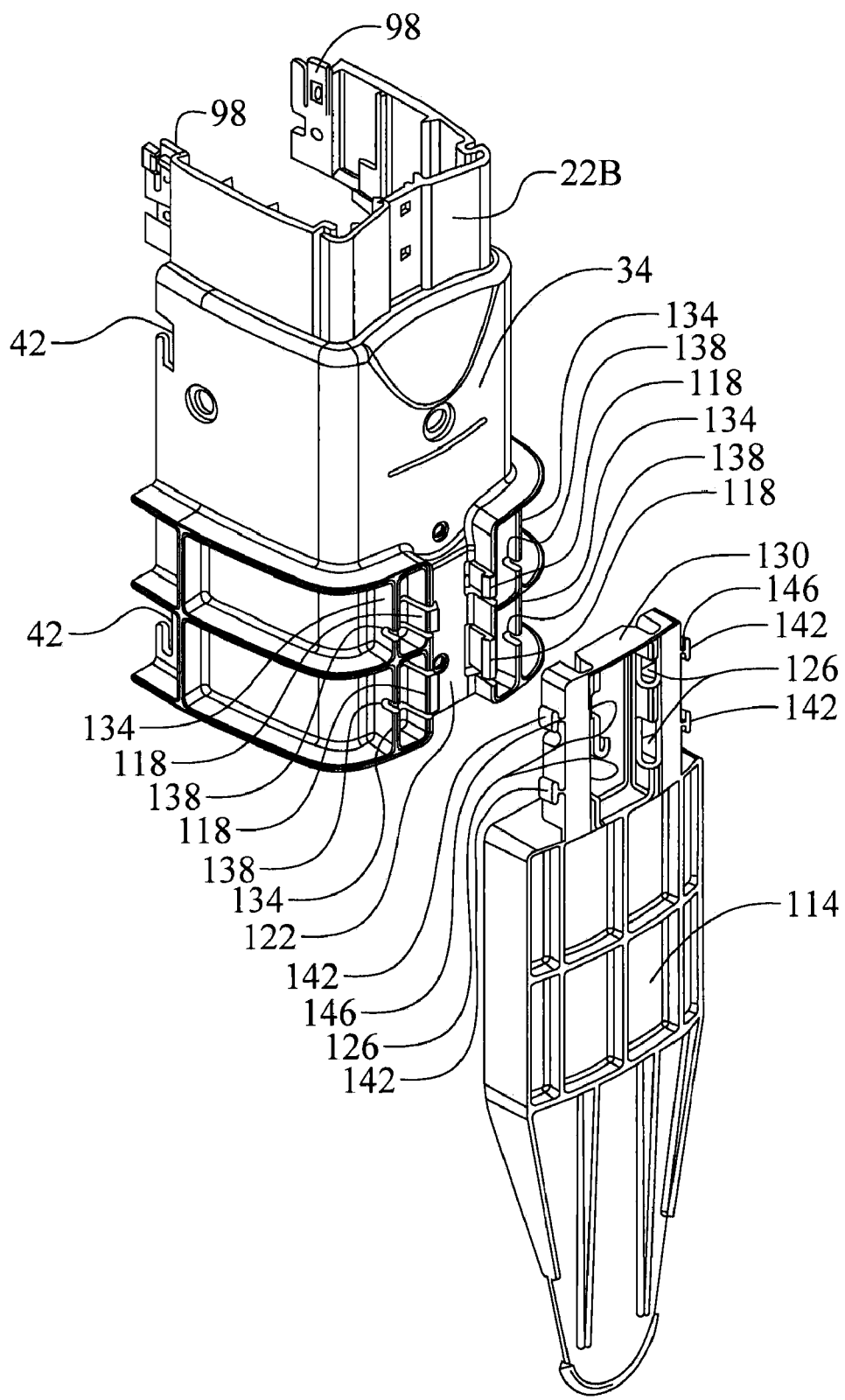
FIG. 4 is an enlarged view of a portion of FIG. 3 illustrating an interconnection of the base and the auxiliary stability spade, in accordance with various embodiments of the present disclosure.

Referring now to FIGS. 3 and 4, in various embodiments the pedestal 10 can include an auxiliary stability spade 114 that can be fixedly connected, or coupled, to either the first or the second wall structure 30 or 34 without the use of assembly hardware. The stability spade 114 can be coupled to the base 14 to provide additional ground stability to the pedestal 10 when the pedestal 10 is installed in areas where the terrain is softer, e.g., beach areas. Although FIGS. 3 and 4 illustrate the stability spade 114 as being fixedly connectable to the second wall structure 34, and will be described herein as such, it should be readily understood that in other embodiments the stability spade 114 can be equally connectable to the first wall structure 30 in the same manner as described herein with regard to FIGS. 3 and 4.

More particularly, in various embodiments, the second wall structure 34 is structured to include a plurality of biased latching fingers 118. The biased latching fingers 118 are integrally formed with and extend substantially orthogonally from an outer surface of a bottom portion 122 of the second wall structure 34. Additionally, the stability spade 114 includes a plurality of latching windows 126 formed within a proximal end portion 130 of the stability spade 114. Each latching window 126 is sized to receive a corresponding one of the latching fingers 118. To fixedly couple the stability spade 114 to the wall structure 34, absent assembly hardware, the stability spade 114 is pressed against the wall structure bottom portion 130 such that biased latching fingers 118 are engaged within the latching windows 126. The biased latching fingers 118 and corresponding latching windows 126 are structured, or formed, so that latching fingers 118 firmly engage the latching windows 126. Therefore, the stability spade 114 is fixedly mounted to the wall structure 34 and can not be easily removed or dislodged.

As illustrated in FIGS. 3 and 4, in various embodiments, the biased latching fingers 118 are integrally formed, e.g., molded, within the bottom portion 122 of the second wall structure 34. Accordingly, the biased latching fingers 118 are biased to an upright or slightly inward position by their integral formation with the bottom portion 122.

In various embodiments, the second wall structure 34 includes a plurality of raised ribs 134 that include at least one alignment and support slot 138. Additionally, the stability spade 114 includes at least one T-tab 142 structured to mate with a respective one of the alignment and support slots 138 when the stability spade 114 is fixedly connected to the second wall structure 34, as described above. Specifically, a neck 146 of each T-tab 142 is sized to slide into the corresponding alignment and support slot 138 as the stability spade proximal end portion 130 is being pressed against the second wall structure bottom portion 122 to fixedly engage the latching fingers 118 with the latching windows 126. The alignment and support slots 138 and T-tabs 142 aid in aligning the stability spade 114 during assembly and provide structural stability of the stability spade 114 when placed in the ground.

Although FIGS. 3 and 4, and the description above, provide that the latching fingers 118 are formed with the second wall structure 34 and the latching windows 126 are formed within the stability spade 114, the reverse could be the case and remain within the scope of the present disclosure. That is, the latching fingers 118 could be formed with stability spade 114 and the latching windows 126 formed within the structure of the second wall structure bottom portion 122, and remain within the scope of the present disclosure.

The base 14, i.e., the first and second wall structures 30 and 34, and stability spade 114 can be constructed of any suitable metallic or non-metallic material. Accordingly, the base 14 and the stability spade 114 can be formed using any suitable means of fabrication, such as casting or molding. For example, in various embodiments, the base 14 and/or the stability spade 114 can be injection molded using any suitable non-metallic plastic or compound, e.g., a glass filled polymer. Additionally, in various embodiments, the stability spade 114 can be fabricated as, or fabricated to include, an electrical grounding source to electrically ground the pedestal 10.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A base for a data distribution terminal pedestal, said base comprising a first wall structure interlockingly connectable with a second wall structure to form the base absent assembly hardware, the first wall structure including at least one latching boss, the second wall structure including at least one retention aperture, at least one of the latching boss and the retention aperture being positioned on a first biased latching tab to force interlocking and firm engagement of the latching boss with the retention aperture when the first and second wall structures are coupled together.

2. The base of claim 1, wherein one of the first wall structure and the second wall structure includes at least one latching button, and the other one of the first wall structure and the second wall structure includes at least one interlocking slot, the at least one latching button sized to fit within the at least one interlocking slot when the first and second wall structures are coupled together.

3. The base of claim 2 wherein the latching boss is configured to engage the retention aperture as the first and second wall structures are moved relative to one another to interlock the latching button with the interlocking slot.

4. The base of claim 3 wherein said other one of the first wall structure and the second wall structure further includes a second biased latching tab, and wherein the retention aperture is positioned on the second biased latching tab.

5. The base of claim 3 wherein the latching button is integrally formed with its corresponding wall structure.

6. The base of claim 3 wherein the latching boss is integrally formed with the first wall structure.

7. The base of claim 3 wherein the latching boss and the retention aperture are positioned on top portions of their corresponding wall structures.

8. A base for a data distribution terminal pedestal, said base comprising a first wall structure interlockingly connectable with a second wall structure to form the base absent assembly hardware, wherein the base first wall structure includes at least one first latching button integrally formed with and extending substantially orthogonally from a first longitudinal tongue extending along a first longitudinal edge portion of the base first wall structure, and at least one second latching button integrally formed with and extending substantially orthogonally from a second longitudinal tongue extending along a second longitudinal edge portion of the base first wall structure.

9. The base of claim 8, wherein the base second wall structure includes at least one first interlocking slot formed within a first longitudinal edge portion of the base second wall structure, and at least one second interlocking slot formed within a second longitudinal edge portion of the base second wall structure.

10. The base of claim 9, wherein each latching button includes a stem and a cap formed at a distal end of the stem, and wherein the stem of each latching button is sized to fit within a corresponding interlocking slot such that the base first and second wall structures can be interlockingly coupled together to form the base absent assembly hardware.

11. The base of claim 10, wherein a top portion of the base first wall structure includes a first latching boss formed on an inner surface of the first longitudinal edge portion and a second latching boss formed on an inner surface of the second longitudinal edge portion.

12. The base of claim 11, wherein a top portion of the base second wall structure includes a first biased latching tab formed within a first shoulder extending from the first longitudinal edge portion and a second biased latching tab formed within a second shoulder extending from the second longitudinal edge portion, each biased latching tab having an aperture formed therein for receiving a corresponding latching boss such that the base first and second walls structures can be retained interlockingly coupled together.

13. A data distribution terminal pedestal comprising a two-piece, assembly hardware free base including a first wall structure interlockingly connectable to a second wall structure to form the base absent assembly hardware, and a top cover configured to be removably mountable to a top portion of the base, wherein the base first wall structure includes at least one first latching button integrally formed with and extending substantially orthogonally from a first longitudinal tongue extending along a first longitudinal edge portion of the base first wall structure, and at least one second latching button integrally formed with and extending substantially orthogonally from a second longitudinal tongue extending along a second longitudinal edge portion of the base first wall structure.

14. The pedestal of claim 13, wherein the base second wall structure includes at least one first interlocking slot formed within a first longitudinal edge portion of the base second wall structure, and at least one second interlocking slot formed within a second longitudinal edge portion of the base second wall structure.

15. The pedestal of claim 14, wherein each latching button includes a stem and a cap formed at a distal end of the stem, and wherein the stem of each latching button is sized to fit within a corresponding interlocking slot such that the base first and second wall structures can be coupled together to form the base, absent assembly hardware, by inserting the button stems into the corresponding interlocking slots and longitudinally moving at least one of the base first wall structure and the base second wall structure relative to the other wall structure to thereby interlock the latching buttons within the corresponding interlocking slots.

16. The pedestal of claim 15, wherein a top portion of the base first wall structure includes a first latching boss formed on an inner surface of the first longitudinal edge portion and a first latching boss formed on an inner surface of the second longitudinal edge portion.

17. The pedestal of claim 16, wherein a top portion of the base second wall structure includes a first biased latching tab formed within a first shoulder extending from the first longitudinal edge portion and a second biased latching tab formed within a second shoulder extending from the second longitudinal edge portion, each biased latching tab having an aperture formed therein such that the base first and second walls structures are retained coupled together to form the base by each latching boss becoming engaged within the corresponding biased latching tab aperture when at least one of the base first wall structure and the base second wall structure are longitudinally moved relative to the other wall structure to interlockingly couple the first and second wall structures together.

18. The pedestal of claim 13, wherein one of the base first wall structure and second wall structure includes a plurality of biased latching fingers formed with and extending substantially orthogonally from an outer surface of a bottom portion of the respective base wall structure.

19. The pedestal of claim 18 further comprising a stability spade including a plurality of latching windows formed therein such that the stability spade is fixedly connectable to the base, absent assembly hardware, by engaging the biased latching fingers within the latching windows.

20. A two-piece, assembly hardware free base for a data distribution terminal pedestal, said base comprising:
a first wall structure including a first longitudinal tongue extending along a first longitudinal edge portion, and a second longitudinal tongue extending along a second longitudinal edge portion, each of the first and second tongues including a plurality of latching buttons having stems integrally formed with and extending substantially orthogonally from the respective tongue and a cap integrally formed at a distal end of each stem; and
a second wall structure including a plurality of interlocking slots formed within each of a first longitudinal edge portion and a second longitudinal edge portion, wherein the interlocking slots are sized to receive a corresponding latching button stem such that the base first and second wall structures can be coupled together to form the base, absent assembly hardware, by inserting the button stems into the corresponding interlocking slots and longitudinally moving at least one of the base first wall structure and the base second wall structure relative to the other wall structure to thereby interlock the latching buttons within the corresponding interlocking slots.

21. The base of claim 20, wherein a top portion of the base first wall structure includes a latching boss formed on an inner surface of the first longitudinal edge portion and a latching boss formed on an inner surface of the second longitudinal edge portion.

22. The base of claim 21, wherein a top portion of the base second wall structure includes a biased latching tab formed within a first shoulder extending from the first longitudinal edge portion and a biased latching tab formed within a second shoulder extending from the second longitudinal edge portion, each biased latching tab having an aperture formed therein such that the base first and second walls structures can be retained interlocked together by each latching boss becoming engaged within the corresponding biased latching tab aperture when at least one of the base first wall structure and the base second wall structure are longitudinally moved relative to the other wall structure to interlockingly couple the first and second wall structures together.

23. The base of claim 20, wherein one of the base first wall structure and second wall structure include a plurality of biased latching fingers formed with and extending substantially orthogonally from an outer surface of a bottom portion of the respective base wall structure, the latching figures structured to engage corresponding latching windows formed within a stability spade such that the stability spade is fixedly connectable to the base, absent assembly hardware.

* * * * *